(12) United States Patent
Chutter (10) Patent No.: US 9,487,269 B1
(45) Date of Patent: Nov. 8, 2016

(54) AERODYNAMICALLY BUOYANT VEHICLE

(71) Applicant: Richard Chutter, Round Pond, ME (US)

(72) Inventor: Richard Chutter, Round Pond, ME (US)

( * ) Notice: Subject to any disclaimer, the term of this patent is extended or adjusted under 35 U.S.C. 154(b) by 0 days.

(21) Appl. No.: 14/951,603

(22) Filed: Nov. 25, 2015

(51) Int. Cl.
*B63B 1/16* (2006.01)
*B63B 1/32* (2006.01)
*B63B 3/38* (2006.01)

(52) U.S. Cl.
CPC ............... *B63B 1/322* (2013.01); *B63B 3/38* (2013.01); *B63B 2003/387* (2013.01)

(58) Field of Classification Search
CPC .................................. B63B 1/322; B63B 3/38
See application file for complete search history.

(56) References Cited

U.S. PATENT DOCUMENTS

| | | | | |
|---|---|---|---|---|
| 978,311 | A * | 12/1910 | Lake ....................... | B63B 1/322 114/273 |
| 3,157,146 | A * | 11/1964 | Billig ....................... | B63B 1/22 114/273 |
| 3,750,978 | A * | 8/1973 | Cunningham ........... | B60V 1/22 244/2 |
| 3,884,172 | A * | 5/1975 | Takahashi ................. | B63B 1/18 114/273 |
| 4,284,027 | A | 8/1981 | Montez | |
| 4,926,778 | A * | 5/1990 | Johnston ................. | B63B 1/322 114/121 |
| 4,964,357 | A * | 10/1990 | Genfan ..................... | B63B 1/24 114/123 |
| 6,176,190 | B1 | 1/2001 | Ozga | |
| 7,631,609 | B1 | 12/2009 | Konstantinovskiy | |
| 7,735,775 | B2 | 6/2010 | Ellnor | |
| 8,196,537 | B2 | 6/2012 | Lee | |
| 2003/0101919 | A1* | 6/2003 | Stevens ................. | B62B 15/002 114/272 |
| 2004/0069201 | A1* | 4/2004 | Jesadanont ............. | B63B 1/322 114/272 |

* cited by examiner

*Primary Examiner* — Stephen Avila
(74) *Attorney, Agent, or Firm* — Buchanan Ingersoll & Rooney PC (57) ABSTRACT

A vehicle includes a keel having a support mount disposed proximate a bow end of the keel and a power plant disposed proximate an aft end of the keel, a support rotatably mounted to the keel at the support mount and supporting a cabin or equipment, a canard mounted to the keel, and an airfoil mounted to the support. The canard is adjustable to thereby adjust an amount of lift provided to the bow end of the keel, and the airfoil is adjustable to thereby adjust an amount of lift provided to the support.

12 Claims, 13 Drawing Sheets

AERODYNAMICALLY BUOYANT VEHICLE

TECHNOLOGICAL FIELD

The present invention relates generally to an aerodynamically buoyant vehicle and particularly to a power boat having a canard adjustably mounted to a keel, a support rotatably mounted to the keel, and an airfoil adjustably mounted to the support.

BACKGROUND DISCUSSION

In conventional boats, the keel and the float mechanism are combined. In other words, the necessary buoyancy is provided by submergence of a portion of the keel in the water such that the keel also acts as a flotation device. However, water is relatively heavy and it takes energy to move the water out of the way in order for the boat to be able to move through the water. The faster the craft moves, the more energy is needed to move the water away (i.e., the greater the drag from the water). Furthermore, the environment in which a water vehicle operates can be a major factor upon how the vehicle operates. For example, the higher the wind speed, the greater the effect on the surface of the water in the form of waves, while the larger the waves, the greater the effect on the motion and speed of the vehicle. A need therefore exists for a power boat in which the drag effects of the water, even when there are relatively large waves, can be greatly reduced while the boat itself remains sufficiently buoyant.

SUMMARY

In a vehicle according to this application, the buoyancy of the craft is transferred mainly to a set of airfoils, to thereby minimize the drag of the vehicle going through the water especially at higher speeds. The part of the keel that touches the water is minimized to a level sufficient to handle the forces the vehicle will encounter, plus a safety factor. And by having minimal drag on the keel, the effect of waves on the performance of the vehicle can be minimized.

In a vehicle according to this application, a portion of the keel is lifted out of the water aerodynamically, while another portion of the keel having the motor is kept within the water so that the boat can be driven. By making the buoyancy of the vessel less dependent on the interface between the keel and the water, the keel is more free to move up and down, and so the effect of the waves on the rest of the vehicle is minimized. The momentum of the keel and its small cross section can minimize the amount of the keel's movement, by contrast to a conventional boat, in which a wave will lift the boat up/down and will slow the boat moving the extra water.

Furthermore, in conventional arrangements in which the cabin is fixed to the keel, lifting a portion of the keel may be impractical since too great a magnitude and/or frequency of cabin rotation can cause unsafe conditions in the cabin, as well as significant passenger discomfort and an inability of the crew to operate the boat effectively. And the performance of some equipment could also be adversely affected by too great a magnitude and/or frequency of rotation. To address this issue, the boat according to this application allows the keel and the cabin support (e.g., the fuselage) to be free to move independently within a common plane. In an example, the keel and the cabin support are connected via a pivot or bearing at the front of the vehicle. With this arrangement, the airfoils stabilize the fuselage and the keel are free to move independently.

The disclosure here involves a vehicle for carrying passengers over a surface. The vehicle includes a keel having a pivot or bearing disposed proximate a bow end of the keel and a power plant disposed proximate an aft end of the keel, a cabin support rotatably mounted to the keel at the pivot or bearing and supporting a cabin or equipment, a canard mounted to the keel, and an airfoil mounted to the cabin support. The canard is adjustable to thereby adjust an amount of lift provided to the bow end of the keel, and the airfoil is adjustable to thereby adjust an amount of lift provided to the cabin support.

The disclosure here involves a vehicle for water applications. The vehicle includes a keel and cabin support, which are connected through a bearing in the bow area. This bearing permits the keel and the cabin support to move independently. A power plant is disposed proximate an aft end of the keel. The cabin support contains a canard in the bow area, and airfoils near the cabin used to support the cabin. The canard is adjustable and is used to control the position of the bow in space and the angle of the thrust of the propeller. The wings are individually adjustable to provide lift for the cabin and to a minor degree to facilitate the bank in a turn.

In an embodiment, the airfoil comprises a left wing and a right wing, said left and right wings being individually or jointly adjustable to provide differing amounts of lift.

In an embodiment, a device is deployable between the airfoil and the water or ground surface to keep the airfoil approximately horizontal at low speeds.

In an embodiment, the power plant drives at least one propeller.

In an embodiment, the propeller is rotatably mounted to the keel, or a rudder, or a combination of the two to steer the craft.

In an embodiment, the end of the keel is provided with a hydrofoil or an airfoil to provide positive/negative lift to keep the propeller in the water.

In an embodiment, the canard is provided with a control system which automatically controls the canard to provide a constant amount of lift to the bow or maintain a constant physical position of the bow with respect to a reference plane.

In an embodiment, the support mount comprises a bearing which can allow the cabin support to maintain its orientation, or to rotate independently of motion of the keel, while the keel rotates up and down to follow the contour of a surface profile.

In an embodiment, the vehicle includes one or more retractable pontoons which deploy proximate the power plant to stabilize the vehicle at low speeds.

In an embodiment, the vehicle includes a directional control mechanism, said direction control mechanism comprising one or more of a rudder or a thrust direction controller.

BRIEF DESCRIPTION OF THE DRAWING FIGURES

Additional features and aspects of the keeled passenger vehicle disclosed here will become more apparent from the following detailed description considered with reference to the accompanying drawing figures in which like elements are designated by like reference numerals.

DETAILED DESCRIPTION

An embodiment in which the passenger vehicle is a power boat is illustrated in FIGS. 1-13. The vehicle includes a keel 1 having a support mount 13 (pivot or bearing) disposed proximate a bow end of the keel 1 and a power plant 2 disposed proximate an aft end of the keel 1. In the embodiment, the major portion of the keel 1 is a longitudinal member extending along the underside of the vehicle from approximately the bow end to the aft end of the vehicle. The design configuration and materials used in the construction of the keel 1 and other components of the vehicle are characterized by light weight, strength, stiffness and corrosion resistance. Examples are fiberglass, marine aluminum, carbon fiber and newer materials as they come on line.

Figure 1:
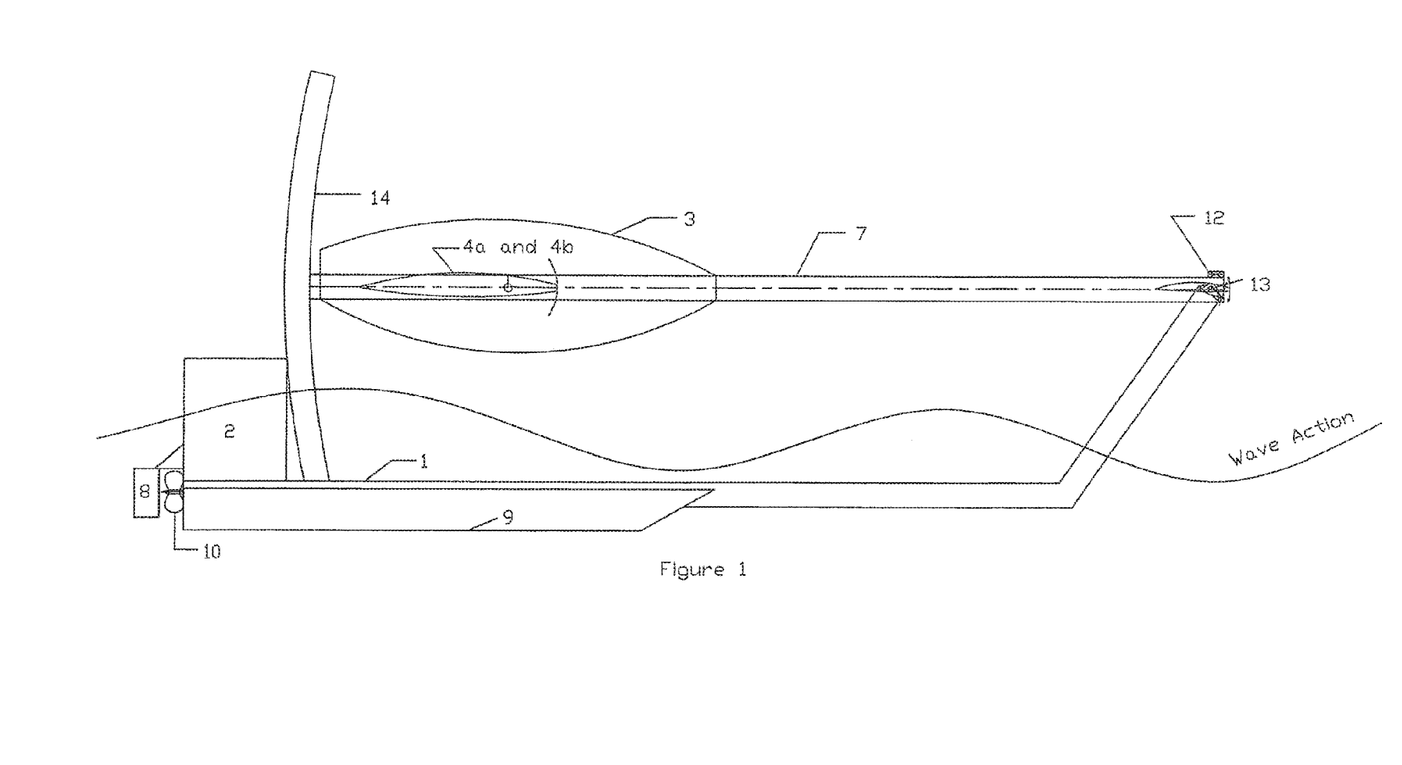
FIG. 1 is a side view of the vehicle with superimposed exemplary wave action.
Figure 2:
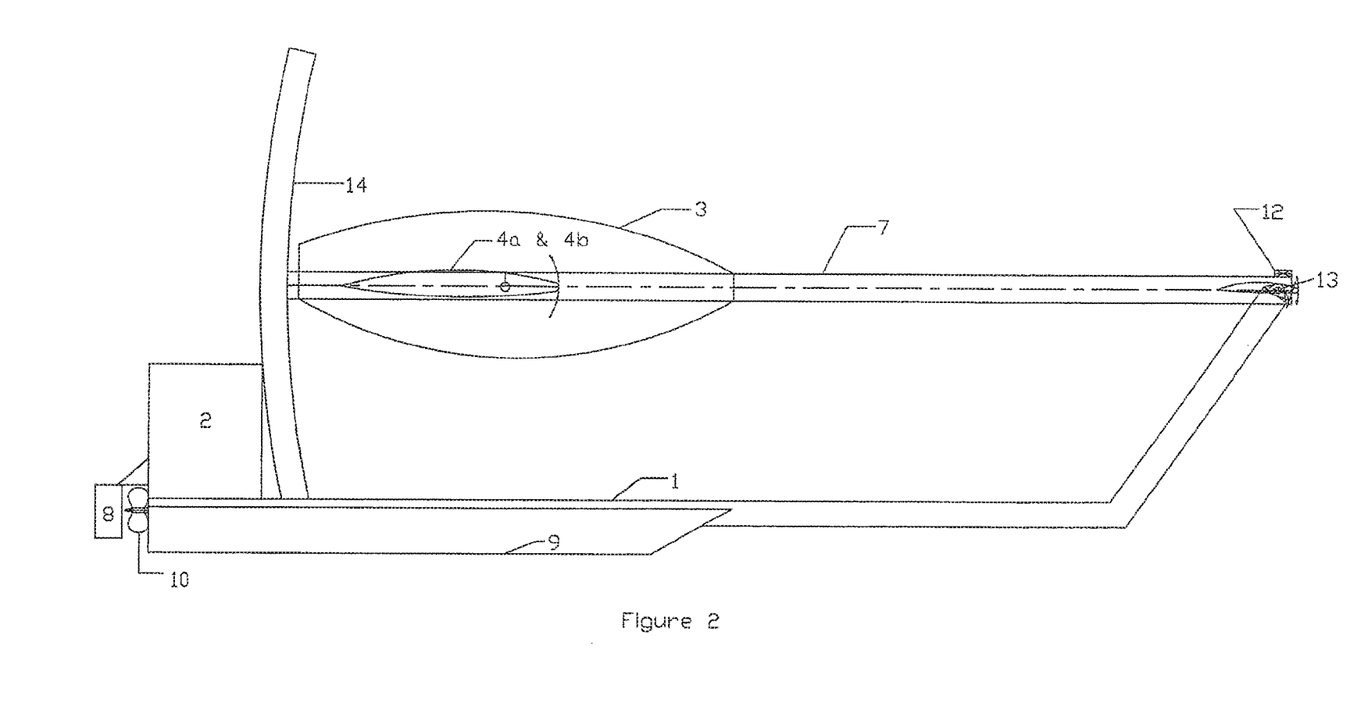
FIG. 2 is a side view of the vehicle with the pontoons deployed.
Figure 3:
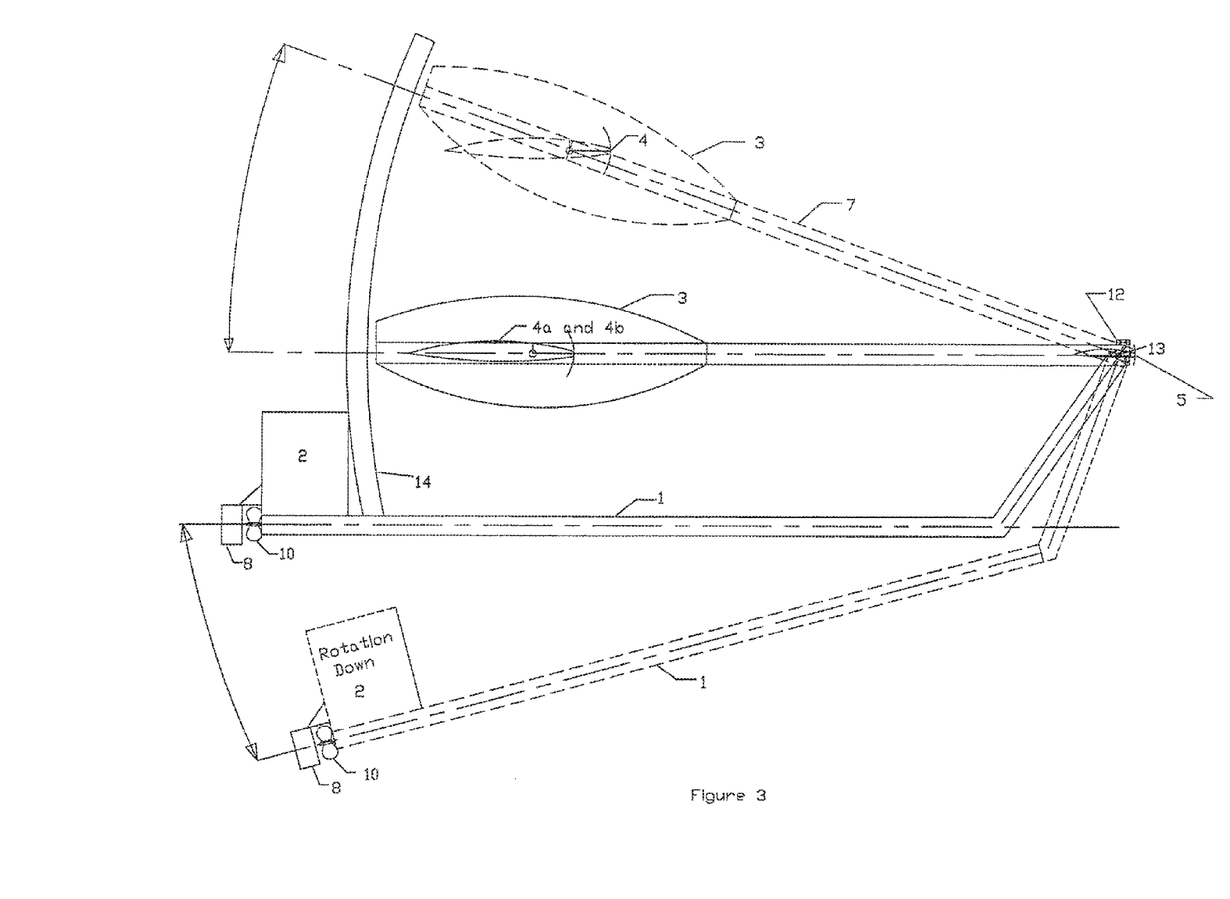
FIG. 3 is a side view of the vehicle showing how the keel and the cabin support move independently. Also shown are the wing and canard rotation capability and the position sensor.

The keel 1 is configured to have an angle which can be adjusted as discussed in detail below. FIG. 3 illustrates two exemplary angles of the keel 1. At an angle of 0°, the portion of the keel 1 to which the power plant 2 is mounted will be approximately level with the medium through which the vehicle travels (e.g., the surface of the water). At this 0° angle, the aft end of the keel 1 at which the power plant 2 is mounted is lower than the support mount 13 at the bow end of the keel 1. In embodiments in which the vehicle is a boat, the portion of the keel 1 which travels through the water at the 0° angle is configured to cooperate with a deployable device discussed in more detail below to keep the boat floating and stabilized when stationary or traveling at low speeds. In the embodiment, the keel 1 has a generally rounded shape, such as an oval shape, and may have a right angle welded to the bottom equidistant to the center line of the keel to take any loads like debris in the water. In the embodiment, top of the keel 1 has a channel for electrical and hydraulic lines, which will also stiffen the tube.

The vehicle further includes a cabin support 7 which is rotatably mounted to the keel 1 at the support mount 13 (in the embodiment, a bearing) and supports a cabin 3 for the passengers and crew. In the embodiment, the bearing 13 is a shared component of both the keel 1 and the cabin support 7 so that the keel 1 and the cabin support 7 can move independently within a common plane. In other words, the bearing 13 connects the cabin support 7 and the keel 1, which permits both to rotate independently. This configuration can allow the cabin support 7 to maintain its orientation or to rotate independently of motion of the keel 1 while the keel 1 rotates up and down to follow the contour of the water profile. FIG. 3 illustrates two exemplary positions of the cabin support 7 as it rotates about the bearing 13. To reduce the side loads on the bearing 13, it is preferable to have a guide structure 14 attached to the keel 1 as a guide for the cabin support 7. Furthermore, the guide structure 14 can help keep the cabin support 7 in the same vertical plane as the keel 1.

The vehicle further includes a canard airfoil 5 mounted at or close to the bow end of the keel 1 such that lift provided to the bow end of the keel 1 causes the bow of the keel 1 to lift relative to the aft end at which the power plant 2 is disposed. The canard 5 is rotationally mounted to the keel 1 such that its angle of attack is adjustable by the pilot to thereby adjust an amount of positive or negative lift provided to the bow end of the keel 1 and thus the angle which the keel 1 makes with horizontal. In the embodiment, the pilot would turn off the sensor 12 (the operation of which is described in detail below), make the needed pitch changes, and then turn the sensor 12 back on to maintain the position of the bow. In general, lift provided to the bow end of the keel 1 can cause a majority of the keel 1 to no longer engage the surface of the water, reducing the drag on the keel 1 from the water.

Figure 4:
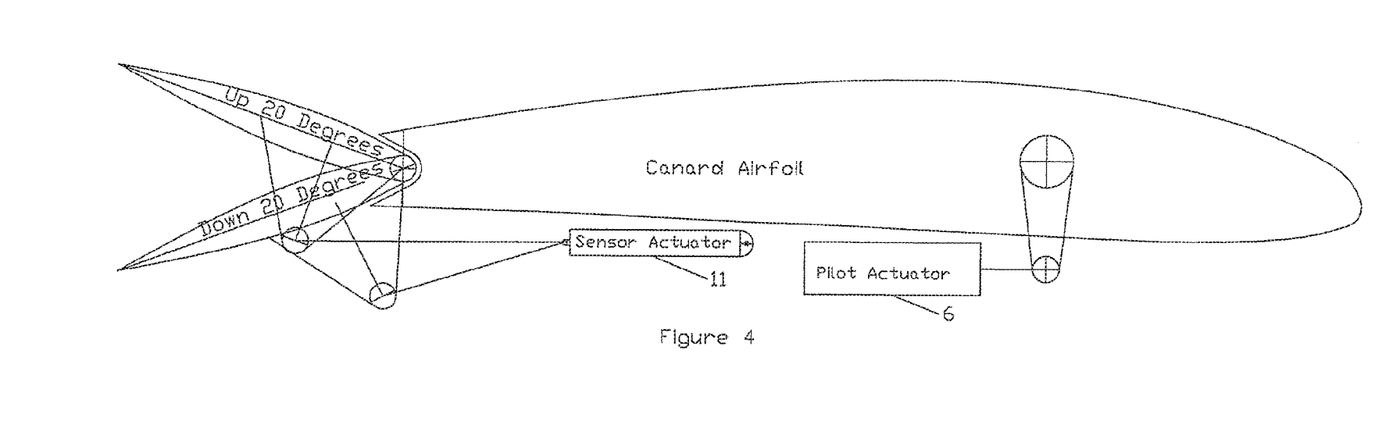
FIG. 4 is a side view of the canard illustrating its sensor-activated airfoil and pilot-activated airfoil.

Furthermore, in an embodiment, elevators on the trailing edge of the canard airfoil 5 can be configured to be automatically adjustable to thereby maintain the bow's position in space. The angle of attack of the canard 5 and its elevators can be, for example, electrically, hydraulically, or cable controlled using mechanisms conventionally found in aircraft. Using one or more sensors 12 (for example, a gyroscope mounted to the bow of the keel 1) which detect the physical position of the bow of the keel 1 with respect to a reference plane, a feedback control system can be provided for automatic control of the elevator of the canard to provide a constant amount of lift and/or maintain a constant physical position of the keel 1 with respect to the reference plane. In other words, the operator can pick the bow up or down by changing the angle of attack of the canard airfoil 5, for example, by pilot-controlled actuator 6, while the gyroscope will sense any changes to the bow position and deflect elevators on the trailing edge of the canard 5, for example, by sensor-controlled actuator 11, to return the bow to its original position. The gyro and associated mechanisms will therefore reduce the workload of the operator and lead to greater stability of the vehicle. FIG. 4 illustrates an exemplary canard 5 rotatable about a central axis by the pilot actuator and having sensor-actuated elevators at its rear end.

Figure 5:
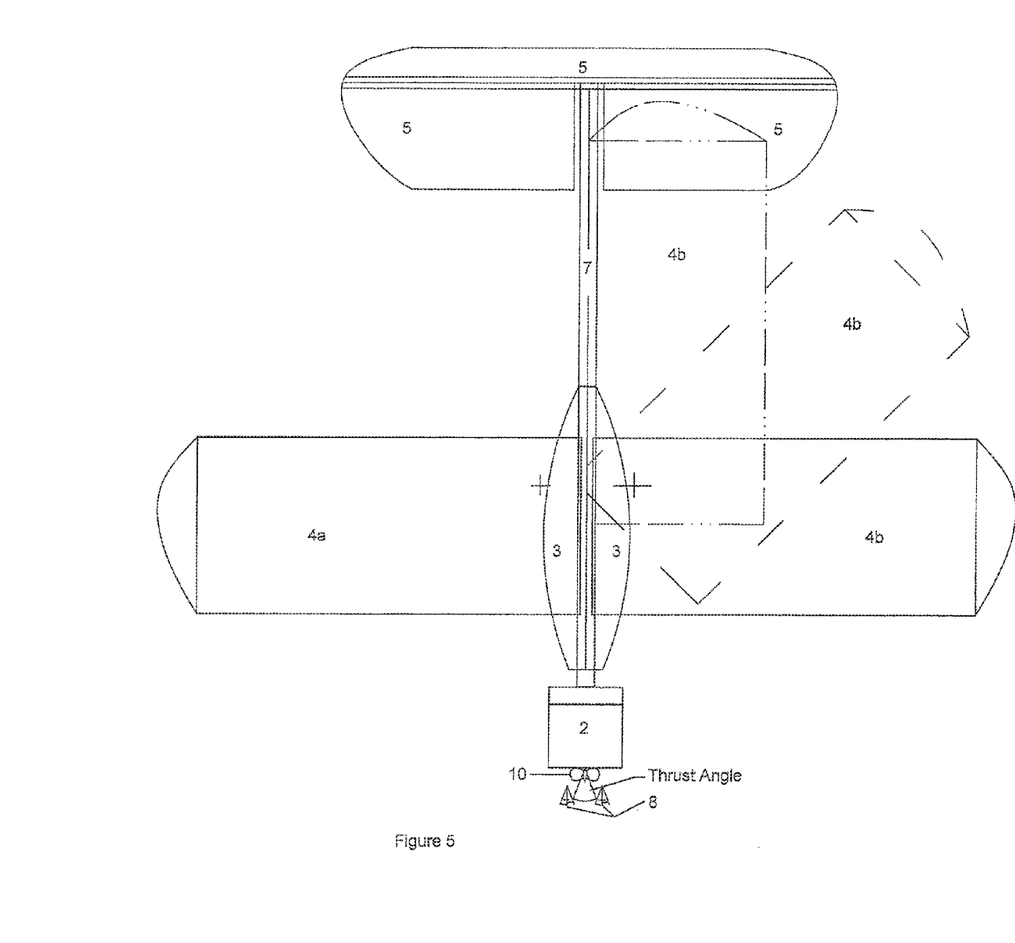
FIG. 5 is a top view of the flexible vehicle showing the canard and the wings, which can rotate forward to be more compact. In the view, the right wing is folded and the left wing is extended. This view also shows the thrust vectoring and rudders.

The vehicle also includes an airfoil 4, including a left wing 4a and a right wing 4b, which are mounted to the cabin support 7 and are individually adjustable to provide differing amounts of lift. In the embodiment, each wing 4a and 4b is mounted to a spar via a bearing such that it can rotate relative to the spar. The angle of each wing 4a, 4b relative to the spar, and optionally, flaps and ailerons on the wings 4a, 4b, can be, for example, electrically, hydraulically, or cable controlled using mechanisms conventionally found in aircraft. The spar can be made, for example, of aluminum or carbon fiber or any high-strength stiff material that is also corrosion free for the environment. The wings 4a, 4b can be made of any suitable material and are preferably buoyant. When the vehicle is stationary or low speed, little lift is generated by the wings 4a, 4b and so the cabin 3 will remain in a resting position as a result of support from, for example, deployable pontoons which are discussed in more detail in the next paragraph. However, at higher speeds, the wings 4a, 4b will provide increasing lift for the cabin 3 and its contents and will stabilize the motion of the cabin 3 even though the keel 1 is reacting to the waves. The differential lift provided each wing 4a, 4b can make the vehicle easier to turn and can compensate for transverse tilting of the boat. And by controlling the wings 4a, 4b at speed, the amount of lift generated by the wings 4a, 4b can be adjusted to thereby stabilize the motion of the cabin 3 when the water is uneven and adjust for the number of passengers and weight being carried by the cabin 3. By providing for individual adjustment of the wings 4a, 4b, the wings 4a, 4b can also be used for steering, and can compensate for transverse tilting of the boat. Furthermore, in an embodiment, the wings 4a, 4b can be rotated inward when not in use to make the vehicle more compact when parked. FIG. 5 illustrates exemplary inward folding of the right wing.

Figure 6:
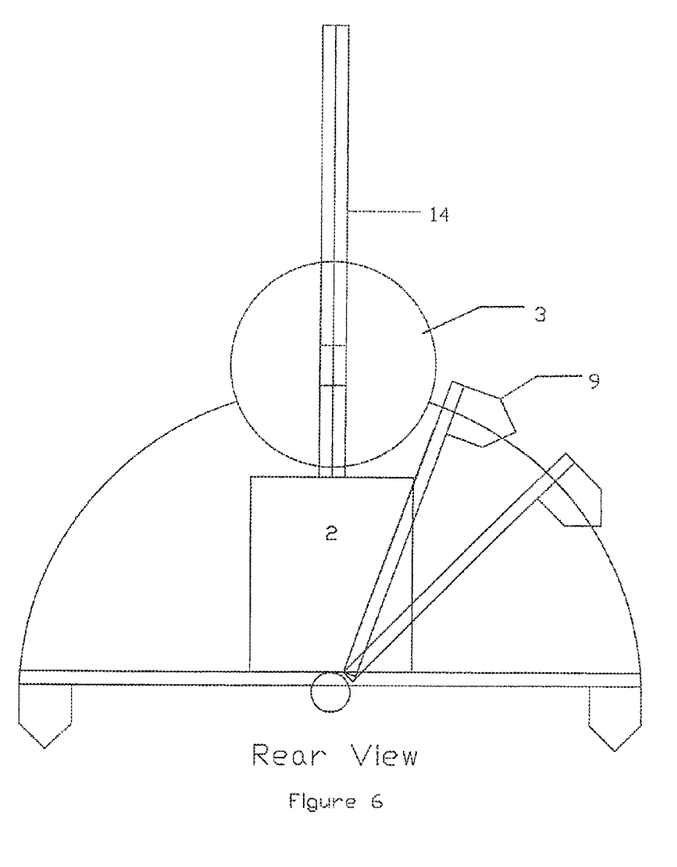
FIG. 6 is a rear view of the vehicle illustrating the pontoon in the undeployed and deployed positions.
Figure 7:
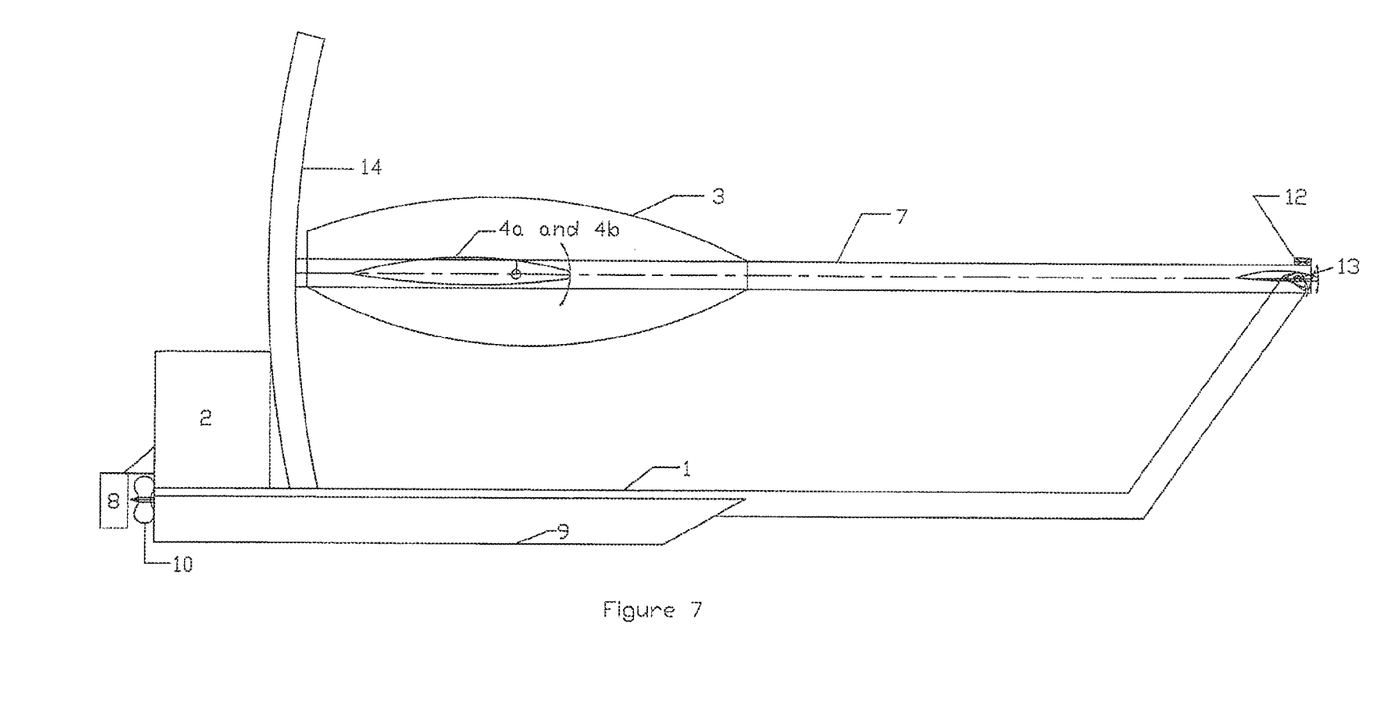
FIG. 7 is a side view of the vehicle illustrating the pontoon in the deployed position.

In the embodiment, the vehicle includes, as a device deployable between the airfoil and the water or ground surface to keep the airfoil approximately horizontal at low speeds, one or more retractable pontoons 9. The retractable pontoons 9 deploy proximate the power plant 2 to stabilize the vehicle at low speeds. At higher speeds, the pontoons 9 can retract, for example, by being folded or rotated up and out of the water and to a height sufficient to avoid most wave action. The pontoons 9 can be attached, for example, to the keel 1 or on the wing tips or the canard tips, and are preferably relatively narrow in order to deal with the higher speeds as the vehicle accelerates but before it reaches a velocity at which the wings 4a, 4b provide sufficient stability and the pontoons 9 can be retracted. The pontoons 9 can be constructed in any way so as to provide buoyancy at a minimum drag, for example as a hollow, foam, or inflatable pontoon structure or a combination of these techniques. FIGS. 6 and 7 illustrate an embodiment in which the pontoons 9 are rotatably attached to the keel 1 near the power plant 2.

Figure 8:
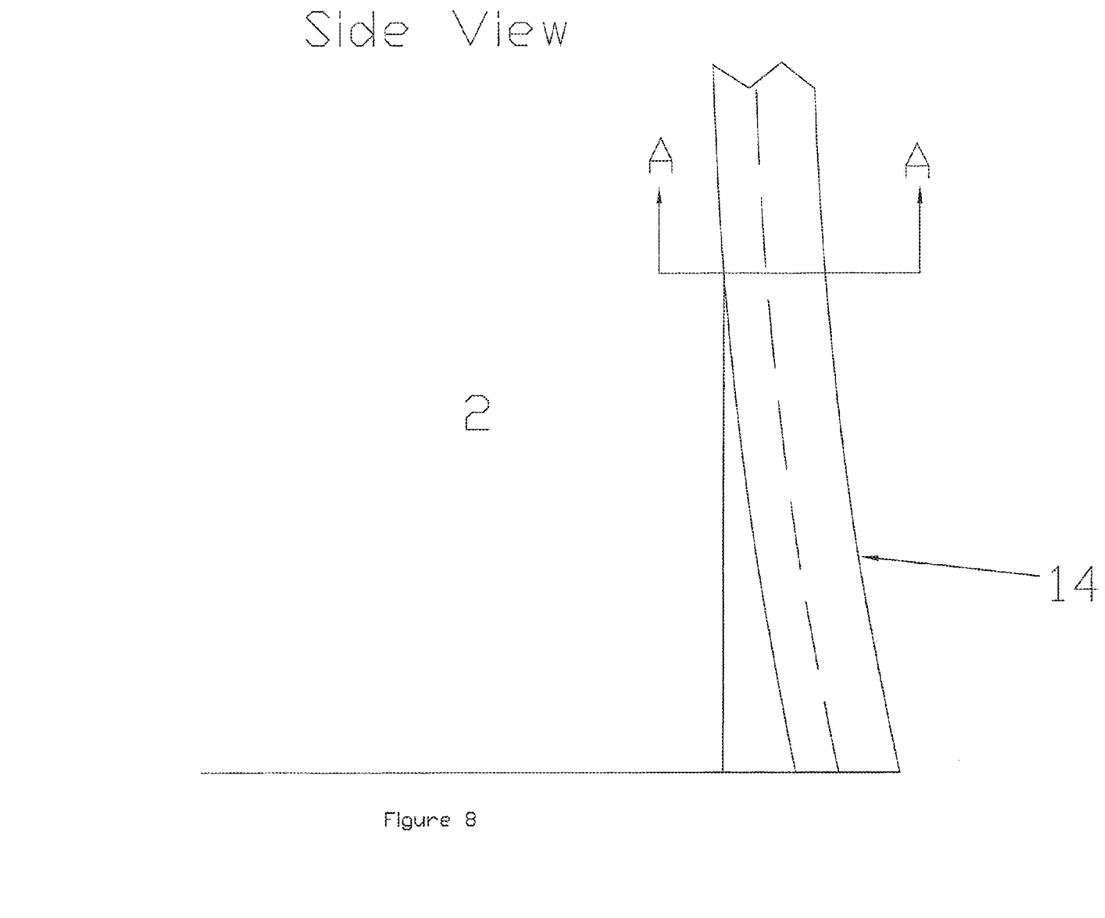
FIGS. 8 and 9 illustrate an example of guide structure for helping keep the cabin support and the keel in the same plane.
Figure 9:
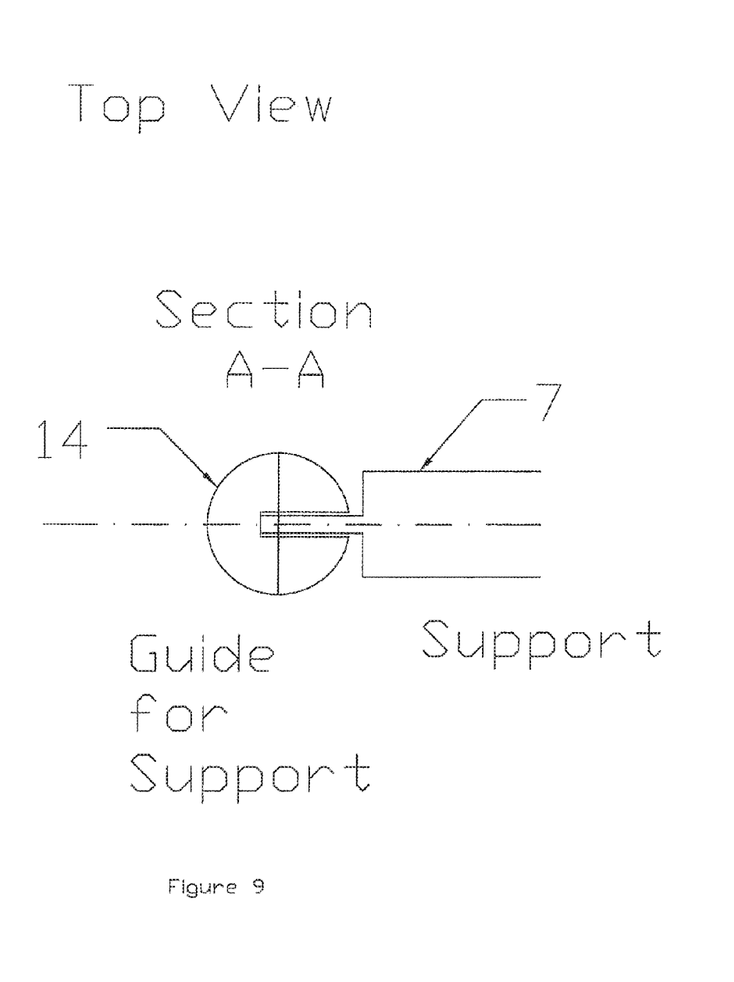

FIGS. 8 and 9 illustrate the guide structure 14 for helping keep the cabin support 7 and the keel 1 in the same plane. The guide structure 14 is mounted to the keel 1 and defines a slot, and a protrusion mounted to the cabin support 7 slides within the slot as the cabin support 7 and the keel 1 rotate relative one another. Of course, an embodiment in which the slot is instead provided on structure of the cabin support 7 and the protrusion is instead provided on structure of the keel is also feasible.

The vehicle's power plant 2 drives a propulsion system for the vehicle, which is a propeller 10 in the disclosed embodiment. Optionally, the power plant 2 is rotatably mounted to the keel 1 and is provided with a power plant hydrofoil or power plant airfoil for providing lift to the power plant 2. This can help keep the power plant 2 in a desirable orientation relative to the water as the keel 1 rotates relative to the water.

As discussed above, the wings 4a, 4b can be used to control the direction of steering of the vehicle. The vehicle can also include a direction control mechanism comprising a rudder 8 or a thrust direction controller. In some embodiments, there may be spoilers on the outer edges of the wings 4a, 4b and/or a fin at the front of the vehicle to assist in directional control.

As discussed above, the canard 5 is rotationally mounted to the keel 1 such that its angle of attack is adjustable by the pilot to thereby adjust an amount of positive or negative lift provided to the bow end of the keel 1 and thus the angle which the keel 1 makes with horizontal. In an embodiment, once the pilot sets an amount of lift, the pilot can then activate the gyroscopic control such that the elevators are automatically controlled to increase or decrease the canard's lift as needed while maintaining, as an approximate average, the amount of lift set by the pilot.

Figure 10:
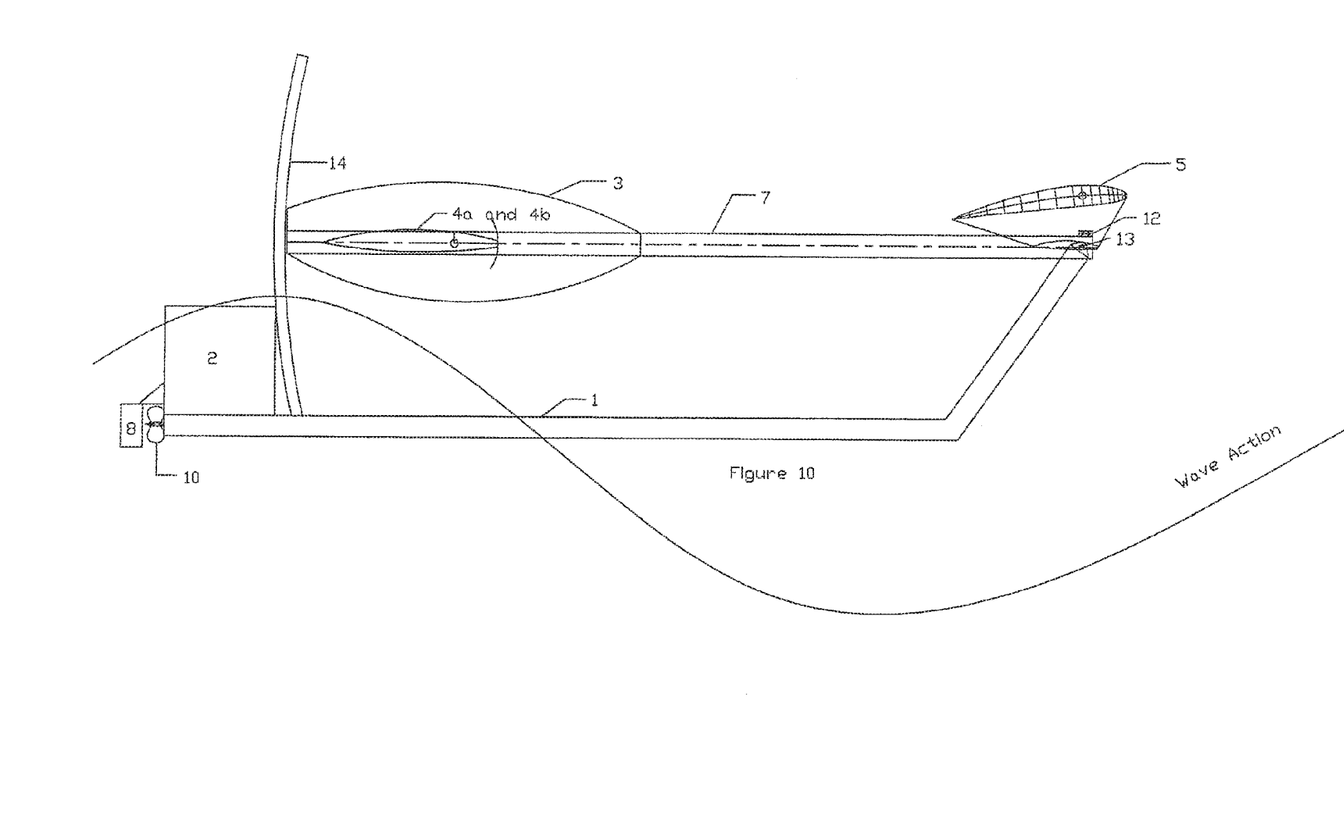
FIG. 10 illustrates the vehicle with the canard rotated to provide positive lift to the bow end of the keel.
Figure 11:
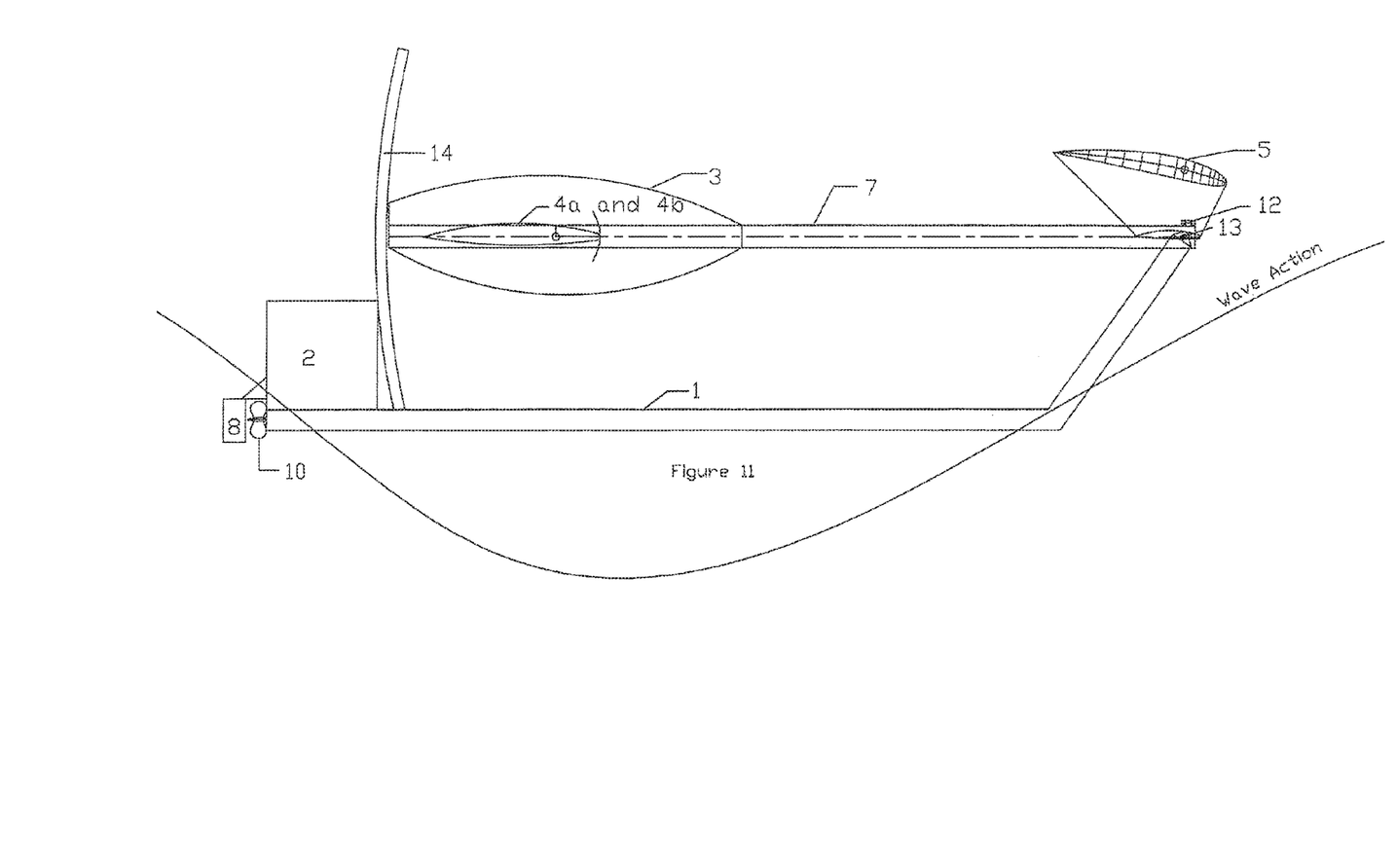
FIG. 11 illustrates the vehicle with the canard rotated to provide negative lift to the bow end of the keel.

FIG. 10 illustrates the canard 5 rotated to provide positive lift to the bow end of the keel. As illustrated in FIG. 10, the bow of the vehicle is at a wave trough. Increasing the lift of the canard 5 when a trough reaches the bow can help keep the bow of the keel 1 from dropping into the trough. Conversely, FIG. 11 illustrates the canard 5 rotated to provide negative lift to the bow end of the keel. As illustrated in FIG. 11, the bow of the vehicle is at a wave front. Providing for negative lift of the canard 5 when a trough reaches the bow can help keep the bow of the keel 1 down so that the vehicle travels through the wave rather than following the contour of the wave.

Figure 12:
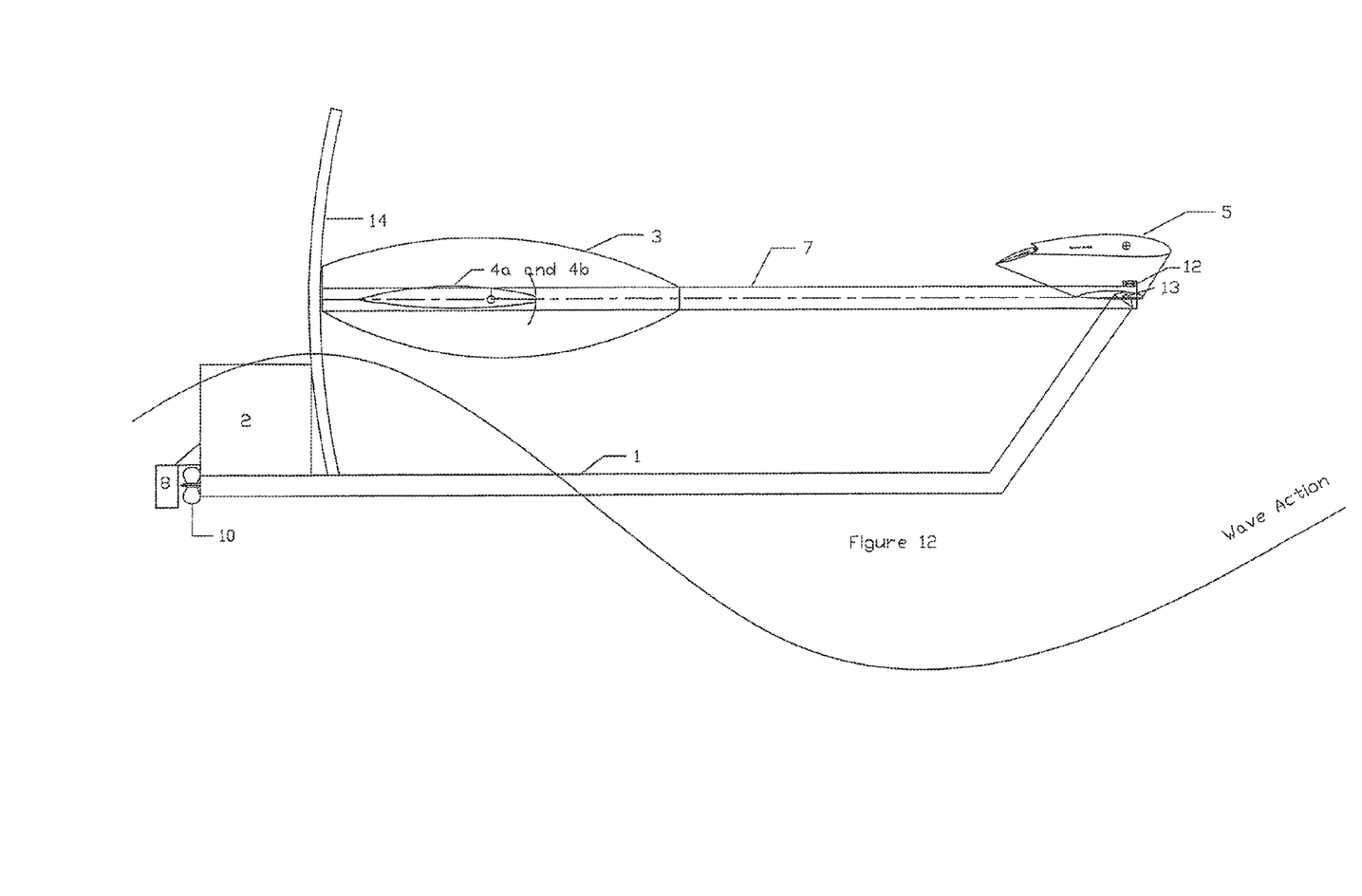
FIG. 12 illustrates the vehicle with the canard elevator activated by the sensor to rotate downward to provide positive lift to the bow end of the keel.
Figure 13:
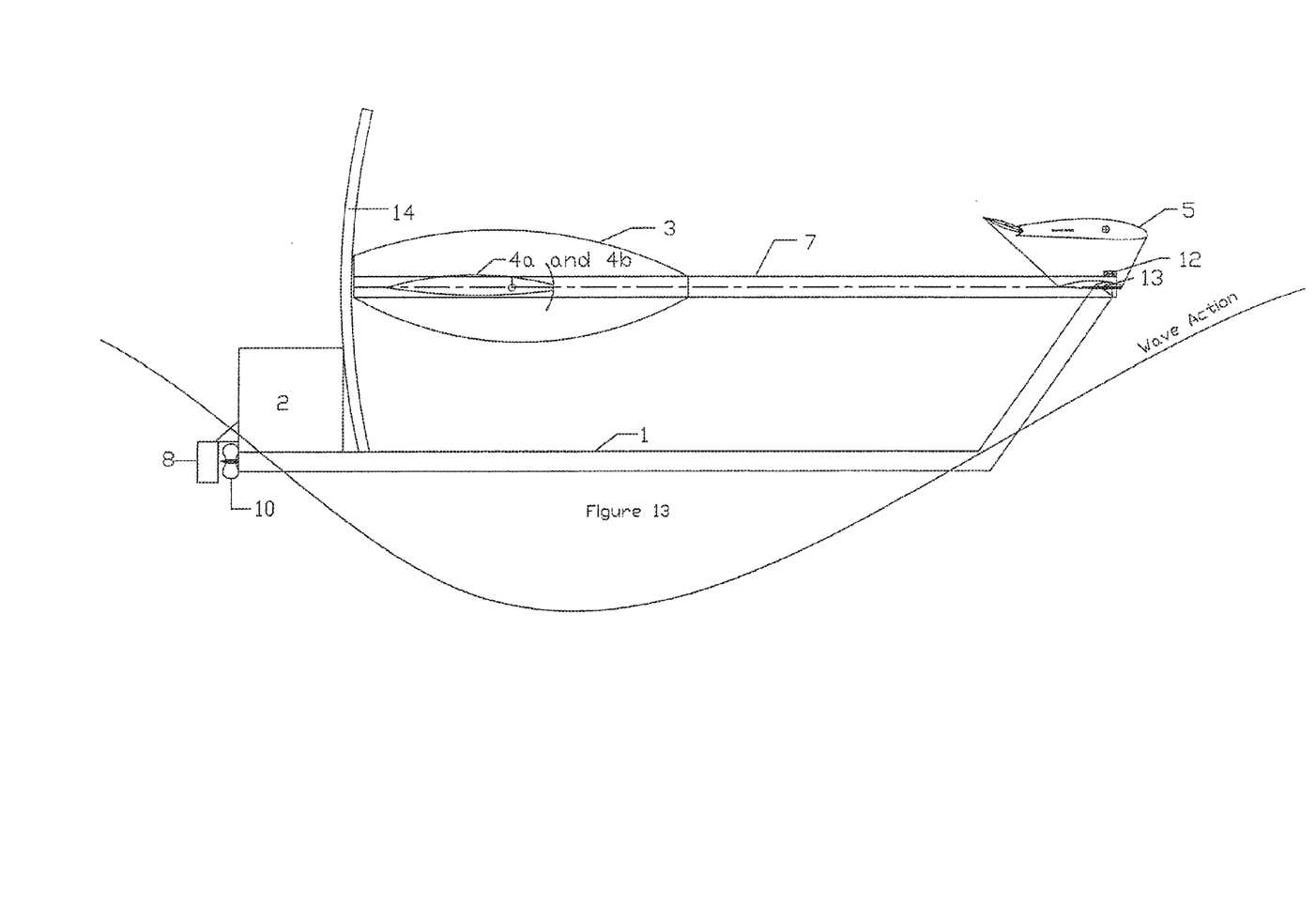
FIG. 13 illustrates the vehicle with the canard elevator activated by the sensor to rotate upward to provide negative lift to the bow end of the keel.

FIGS. 10 and 11 illustrate the lift of the canard 5 being adjusted by rotation of the canard 5 (i.e., by the pilot), and with the elevators not shown in those figures for clarity purposes. Furthermore, with the above-discussed gyroscopic control enabled (i.e., with the sensor 12 and associated feedback control system turned on), the lift of the canard can instead be automatically changed in response to sensor readings by adjusting the elevators, while maintaining the approximate average lift previously set by the pilot in setting the angle of attack of the canard 5. This gyroscopic control can help maintain the selected position of the bow when it sensed that a wave is starting to push the bow up or a trough is allowing the bow to start to fall or when other conditions such as windspeed change. FIGS. 12 and 13 illustrate an example of automatic gyroscopic control of the elevators on the canard.

The detailed description above describes features and aspects of embodiments of a keeled vehicle disclosed by way of example. The invention is not limited, however, to the precise embodiments and variations described. Changes, modifications and equivalents can be employed by one skilled in the art without departing from the spirit and scope of the invention as defined in the appended claims. It is expressly intended that all such changes, modifications and equivalents which fall within the scope of the claims are embraced by the claims. For example, instead of a power boat, the above-described features can be modified and applied to other types of crafts. A land (hard or soft e.g. desert) or snow/ice vehicle can have, for example, a drive wheel/studded wheel or tread instead of a propeller and retractable wheels/studded wheels or treads instead of pontoons. Furthermore, while a single keeled structure has been described, a vehicle may include multiple keels. A vehicle according to the disclosure can also be a combination water/land configuration.

What is claimed is:

1. A vehicle for carrying one or more of passengers or material over a surface, said vehicle comprising:
    a keel having a support mount disposed proximate a bow end of the keel and a power plant disposed proximate an aft end of the keel;
    a support rotatably mounted to the keel at the support mount and supporting a cabin or equipment;
    a canard mounted to the keel; and
    an airfoil mounted to the support;

wherein the canard is adjustable to thereby adjust an amount of lift provided to the bow end of the keel; and wherein the airfoil is adjustable to thereby adjust an amount of lift provided to the support.

2. The vehicle of claim 1, wherein the airfoil comprises a left wing and a right wing, said left and right wings being individually or jointly adjustable to provide differing amounts of lift.

3. The vehicle of claim 1, further comprising a device deployable between the airfoil and the surface to keep the airfoil approximately horizontal at low speeds.

4. The vehicle of claim 1, wherein the power plant drives at least one propulsion mechanism.

5. The vehicle of claim 4, wherein the propulsion mechanism is rotatably mounted to the keel, or a rudder, or a combination of the two to steer the vehicle.

6. The vehicle of claim 4, wherein an end of the keel is provided with a hydrofoil or an airfoil to provide positive/negative lift to keep the propulsion mechanism in water or on a surface.

7. The vehicle of claim 1, wherein the canard is provided with a control system which automatically controls the canard to provide a constant amount of lift to the bow of the keel or maintain a constant physical position of the bow of the keel with respect to a reference plane.

8. The vehicle of claim 1, wherein the support mount comprises a bearing which can allow the support to maintain its orientation or to rotate independently of motion of the keel, while the keel rotates up and down to follow the contour of a surface profile.

9. The vehicle of claim 1, further comprising one or more retractable pontoons, wheels, or other devices which deploy to stabilize the vehicle at low speeds.

10. The vehicle of claim 9, wherein the one or more retractable pontoons, wheels, or other devices deploy proximate the power plant.

11. The vehicle of claim 1, further comprising a directional control mechanism, said direction control mechanism comprising one or more of a rudder or a thrust direction controller.

12. The vehicle of claim 1, wherein the support mount comprises a pivot or bearing.

* * * * *